L. C. SHARP.
CAN COVER GASKET RING MACHINE.
APPLICATION FILED DEC. 5, 1910.

1,051,643.

Patented Jan. 28, 1913.

3 SHEETS—SHEET 1.

Inventor,
Lee C. Sharp.
By David O. Barnell.
Attorney.

Witnesses:
Roy L. Kratz.
Beatrice Cole.

L. C. SHARP.
CAN COVER GASKET RING MACHINE.
APPLICATION FILED DEC. 5, 1910.

1,051,643.

Patented Jan. 28, 1913.

3 SHEETS—SHEET 2.

Witnesses:
Roy G. Kratz
Beatrice Cole

Inventor
Lee C. Sharp.
By David O. Barnell
Attorney

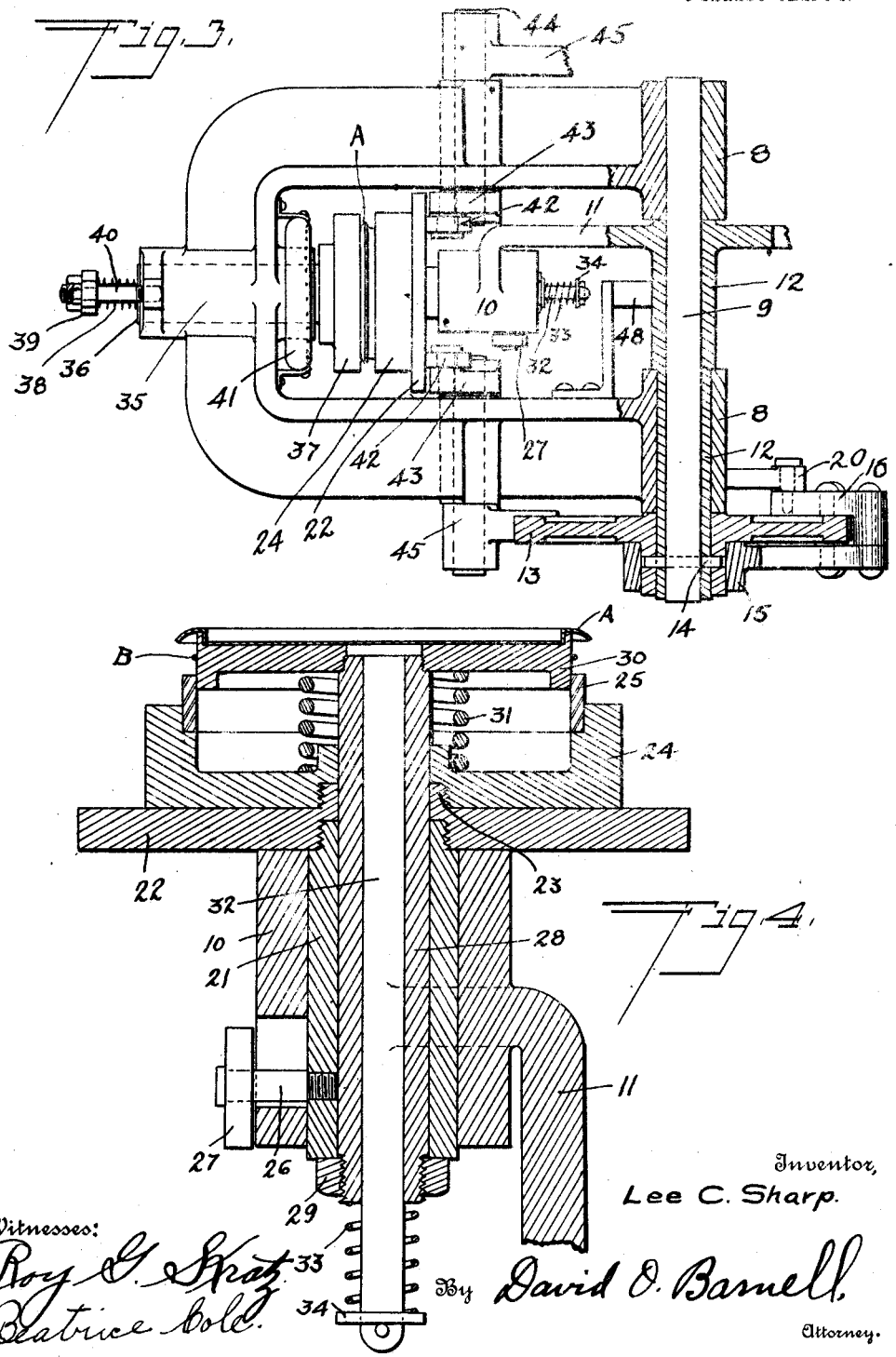

UNITED STATES PATENT OFFICE.

LEE C. SHARP, OF PLATTSMOUTH, NEBRASKA, ASSIGNOR TO AMERICAN CAN COMPANY, OF NEW YORK, N. Y., A CORPORATION OF NEW JERSEY.

CAN-COVER-GASKET-RING MACHINE.

1,051,643. Specification of Letters Patent. Patented Jan. 28, 1913.

Application filed December 5, 1910. Serial No. 595,825.

*To all whom it may concern:*

Be it known that I, LEE C. SHARP, a citizen of the United States, and a resident of Plattsmouth, in the county of Cass and State of Nebraska, have invented certain new and useful Improvements in Can-Cover-Gasket-Ring Machines, of which the following is a specification.

My invention relates to machines for attaching gasket-rings of plastic material to the covers of sheet-metal cans preparatory to seaming said covers upon the can-bodies.

It is the object of my invention to provide a compact, durable and efficient machine of this class, which may be readily adapted for operating on can-covers of different sizes.

Figure 1:
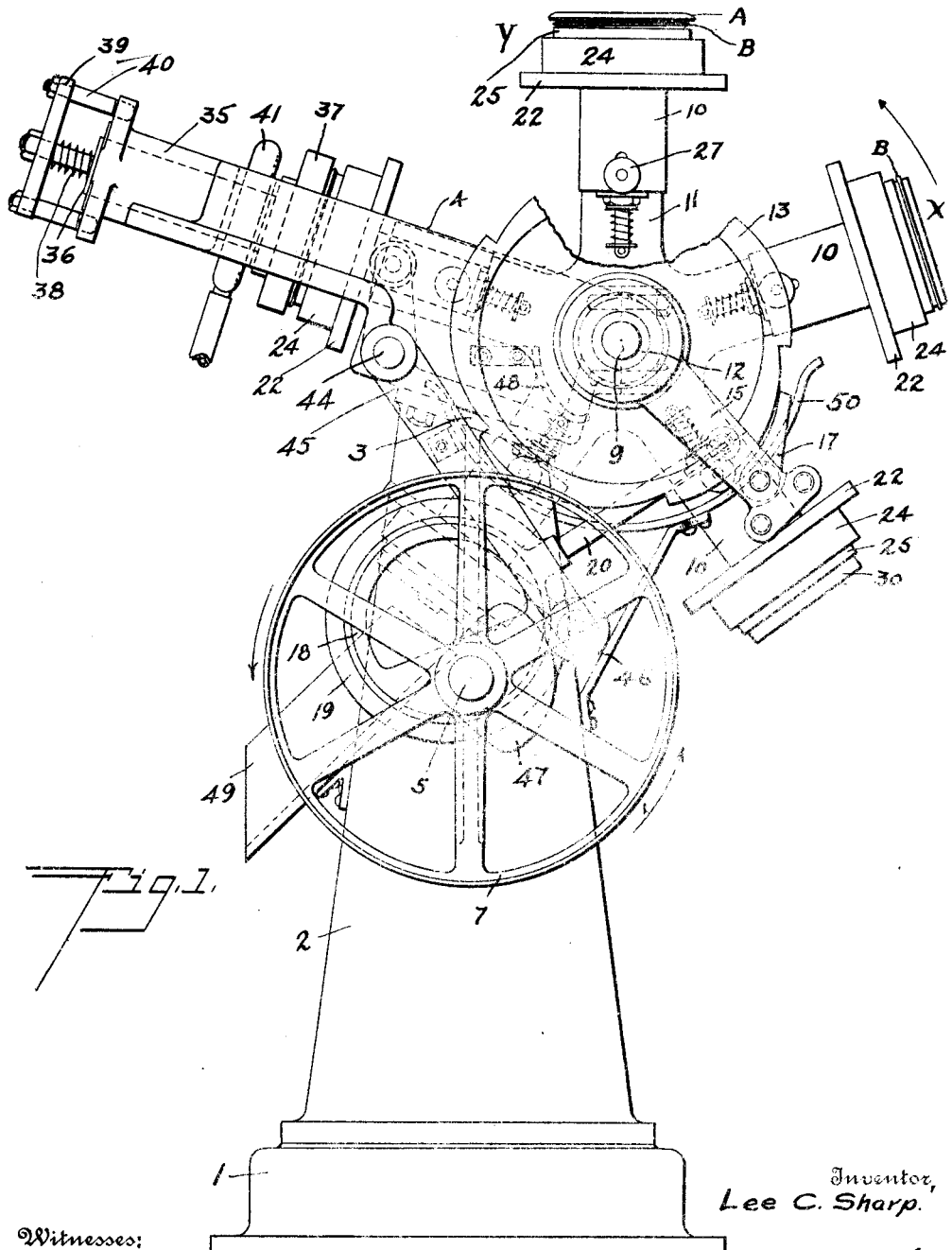
Figure 2:
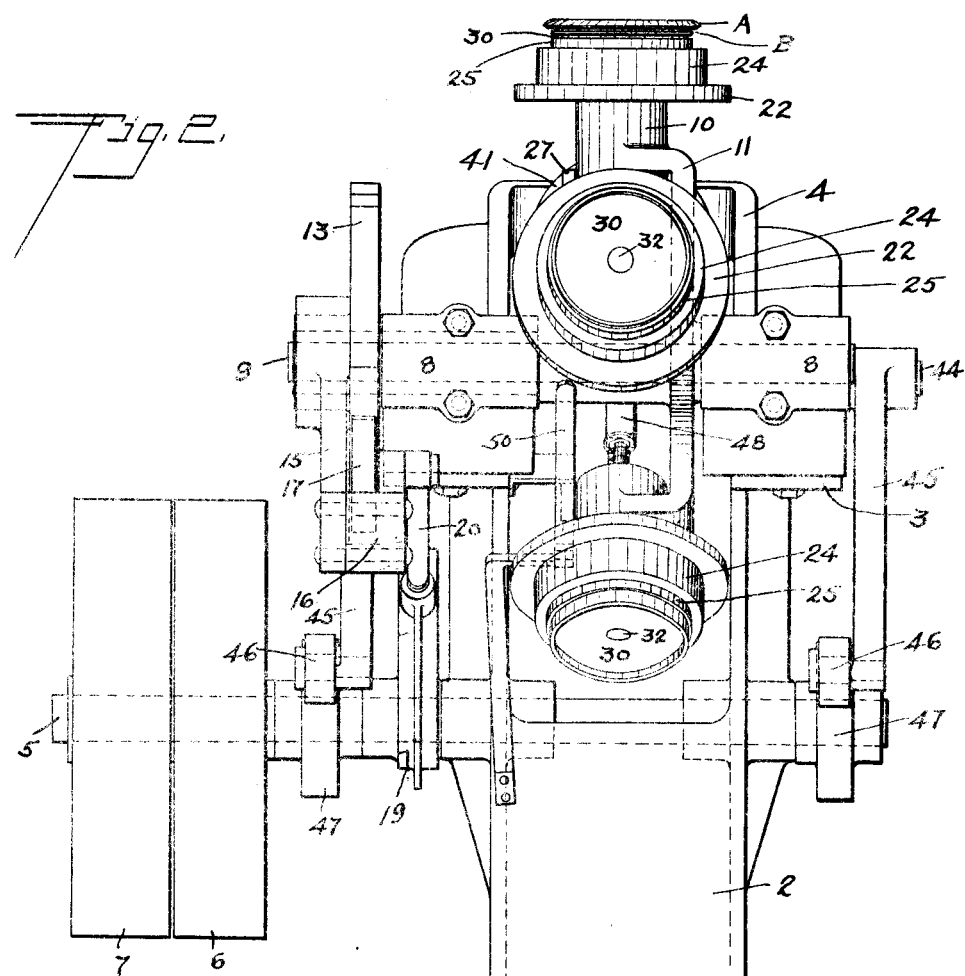

In the accompanying drawings, Figure 1 is a side elevation of a machine embodying my invention, Fig. 2 is a front elevation of the same, Fig. 3 is a detail plan view of the head-yoke, partly in section on the axis of the turret-shaft, and Fig. 4 is a detail axial section of one of the turret-heads.

In the construction shown I provide a suitable base 1 upon which is secured the main frame 2. On the upper part of the main frame are the inclined flanges 3 to which is secured the head-yoke 4. In the main frame are formed bearings for the driving-shaft 5 which is provided at one end with tight and loose pulleys 6 and 7 adapted for connection with a suitable driving belt. The head-yoke 4 stands in a slightly inclined position parallel with the flanges 3, and at the front end of the yoke are formed bearings 8 for the turret-shaft 9 which is disposed parallel with the driving-shaft 5. Upon the said shaft 9 is mounted the turret-wheel which comprises a series of heads 10 carried upon arms 11 extending radially from the hub 12. A part of the hub 12 is extended through one of the bearings 8, and upon the end thereof is mounted the ratchet-wheel 13. A pin 14 is passed through the hub of the ratchet-wheel, the hub 12 and shaft 9, as shown in Fig. 3, to secure said parts together. Upon the hub of the ratchet-wheel is revolubly mounted the pawl-arm 15 which extends out past the periphery of the ratchet-wheel and at the end has secured thereto an angle-block 16 which extends inwardly over the inner face of the wheel as shown in Figs. 2 and 3.
The said angle-block thus serves to keep the pawl-arm from slipping off the end of the wheel-hub. In the space between the pawl-arm and the inward extension of the angle-block the pawl 17 is pivotally mounted so as to engage the periphery of the ratchet-wheel. An eccentric 18 is secured on the driving-shaft 5 and from the strap 19 around said eccentric a rod 20 extends to and is connected with the inner end of the angle-block 16. Rotation of the driving-shaft thus imparts a reciprocating movement to the pawl-arm, and the pawl 17 is intermittently engaged with the teeth of the ratchet-wheel and moved to advance said wheel and the turret-shaft and turret-wheel.

In each of the heads 10 of the turret-wheel is a radial cylindrical opening through which passes a tubular stem 21. At the outer end of said stem a circular plate 22 is screwed thereon, and upon the outer side of said plate is a short threaded nipple 23. Onto said nipple is screwed a cup 24 in the outer end of which the stripping ring 25 is secured, as shown in Fig. 4. At one side of the tubular stem 21 is a stud 26 which extends out through a slot in the side of the head 10 and carries on its outer end a roller 27. Passing slidably through the stem 21 is a second tubular stem 28 which carries at its inner end a nut 29, and upon its outer end is screwed the chuck-plate 30. The chuck-plate fits slidably within the stripping-ring 25 and the outer face of the chuck-plate is recessed to receive and retain a can-cover A, and between the chuck-plate and cup 24 is placed a coil spring 31 adapted to press said parts in opposite directions. The relative movement of the parts is limited by the nut 29 which engages the end of the stem 21. The ejector or knock-out pin 32 passes slidably through the stem 28, and the head of the pin normally rests against the outer end of the stem, being held in engagement therewith by the spring 33 which is placed around the inner end of the pin between the end of the stem 28 and a washer 34 secured upon the pin as shown.

At the rearward end of the head-yoke and integral therewith is a sleeve 35 through which slidably passes the stem 36 of the hot-plate 37. The outer end of the stem 36 is reduced in diameter and upon the reduced portion is placed a coil spring 38 of which one end engages the shoulder on the stem and the other end engages the cross-bar 39.

The cross-bar 39 is carried by studs 40 which extend out from lugs on the end of the sleeve 35, as shown. The end of the stem passes through the cross-bar 39 and is provided with a nut which bears upon the bar to limit movement of the stem and hot-plate which are pressed yieldably inward by the spring 38. The axis of the stem 36 is radial to the turret-shaft center, and the ratchet driving mechanism of the turret is so arranged that at each movement of the turret one of the chuck-plates 30 is brought into proximity to and parallel with the hot-plate 37. A circular gas-burner 41 is arranged behind the plate 37, as shown, and is constructed so that a series of jets impinge on the rearward face of the plate to heat the same.

In the operation of the machine the gasket-rings B which are to be attached to the can-covers are placed around the chuck-plates while the turret-heads pause at the position X indicated in Fig. 1. The can-covers are placed upon the chuck-plates while the turret-heads are in the position Y shown in the same figure. When the turret-heads reach the position in front of the hot-plate the plate 22 is engaged and pushed outwardly by rollers 42 carried on the ends of arms 43 which are secured on the inner ends of shafts 44 extending through the side portions of the head-yoke. On the outer ends of said shafts are carried arms 45 which extend downward and carry at their lower ends rollers 46 which engage cams 47 carried on the driving-shaft 5, as shown. The rollers are held in engagement with the cams by the weight of the arms, but suitable springs may be arranged, if desired, to hold the rollers against the cams. When the plate 22 is pushed outwardly the chuck-plate is first actuated thereby to push the can-cover against the hot-plate, after which the spring 31 is compressed and by the continued movement of the plate 22, the cup 24 and ring 25 the latter strips the gasket-ring from the chuck-plate and presses it against the can-cover. The gasket-ring, being softened by the heat transmitted thereto from the hot-plate, is flattened between the stripping-ring and cover and caused to adhere to the latter. At the next movement of the turret-wheel following the attaching of the gasket-ring to the can-cover, the inner end of the ejector-pin for the respective chuck engages the stationary cam 48, by which the pin is pushed outwardly and the can-cover pushed off the chuck-plate so as to fall into the discharge-chute 49 at the back of the machine. While at the lower part of the turret-wheel the rollers 27 engage the track 50 which is supported upon the frame 2 and is arranged concentrically to the turret-shaft. By said engagement of the rollers 27 with the track the stems 21 are prevented from moving by gravity outwardly through the heads 10 while the same are at the lower part of the wheel. For adapting the machine for different sizes of can-covers the cups 24 are unscrewed from the nipple 23 on the plates 22, the chuck-plates are screwed off the stems 28, and each is replaced by a similar part of suitable size for the can-covers which are to be handled. The cups 24, of course, carry stripping-rings 25 of a size to fit around the chuck-plates.

Now, having described my invention, what I claim and desire to secure by Letters Patent is;

1. In a machine of the class described, a turret revoluble on a horizontal axis, a series of chuck-plates carried by the turret, the outer part of said chuck-plates being adapted to receive and retain can-covers and the peripheral part to receive and retain gasket-rings, a hot-plate arranged adjacent to the path of travel of the chuck-plates, and means for stripping the gasket-rings from the chuck-plates to press the same against the can-covers and to yieldably press the can-covers against the hot-plate.

2. In a machine of the class described, a turret mounted to revolve in a vertical plane, means for intermittently turning the same, chuck-plates carried by the turret and extending tangentially thereto, the chuck-plates being adapted to carry gasket-rings on the periphery thereof and can-covers on the outer side thereof, heating means disposed adjacent to the path of travel of the chuck-plates, and means for simultaneously pressing the gasket-rings against the can-covers and pressing the can-covers against the heating means.

3. In a machine of the class described, a series of chuck-plates mounted to move edgewise in a circular path, a heating device arranged adjacent to said path, means for actuating the chuck-plates to bring them successively to a position adjoining the heating device, stripping devices surrounding the chuck-plates, and means for moving the stripping devices and the chuck-plates toward the heating device radially of the circular path.

4. In a machine of the class described, an element mounted to revolve in a vertical plane, means for intermittently moving the same, a body always positioned radially thereto, carried thereby and movable radially, said body comprising a chuck-plate, a stripping device and a resilient member arranged to press the chuck-plate and stripping device in opposite directions, a heating device, and means for actuating the radially movable body toward the heating device.

5. In a machine of the class described, a turret having a plurality of heads, concentric stems movable radially in each of the heads, a chuck-plate carried by one of said stems, a stripping device connected with the other of said stems, a spring arranged to press the chuck-plate and stripping device in opposite directions, a heating device, means for actuating the turret to bring the chuck-plates successively into proximity to the heating device, and means for actuating the stripping device to move the same and the chuck-plate toward the heating device, the heating device limiting the outward movement of the chuck-plate so that the movement of the stripping device will be greater than the movement of the chuck-plate.

6. In a machine of the class described, a turret having a plurality of heads, stems concentric to each other and movable radially in the heads, a chuck-plate detachably connected with one of the stems, a stripping device detachably connected with the other stem, resilient means arranged to press the stems in opposite directions, means limiting the movement of the stripping device relative to the turret-head, a yieldably supported plate, means for actuating the turret to bring the chuck-plates successively into proximity to said plate, and means for actuating the stripping devices and chuck-plates toward said plate while the same are held by the turret in proximity thereto.

7. In a machine of the character described, in combination: a turret having a plurality of can head carrying chuck plates radially arranged and movable radially thereon; a relatively stationary hot-plate radially disposed relatively to the turret; gasket strippers adjacent each of said chuck plates and adapted to coöperate therewith; and means for rotating said turret to thereby position the chuck plates one by one, adjacent said hot plate, substantially as specified.

In testimony whereof I have hereunto subscribed my name in the presence of two witnesses.

LEE C. SHARP.

Witnesses:
GEORGE L. BARTON,
DAVID O. BARNELL.